US010725937B2

(12) United States Patent
Williams et al.

(10) Patent No.: US 10,725,937 B2
(45) Date of Patent: Jul. 28, 2020

(54) SYNCHRONIZED ACCESS TO SHARED MEMORY BY EXTENDING PROTECTION FOR A STORE TARGET ADDRESS OF A STORE-CONDITIONAL REQUEST

(71) Applicant: INTERNATIONAL BUSINESS MACHINES CORPORATION, Armonk, NY (US)

(72) Inventors: Derek E. Williams, Round Rock, TX (US); Guy L. Guthrie, Austin, TX (US); Hugh Shen, Round Rock, TX (US); Sanjeev Ghai, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 16/049,011

(22) Filed: Jul. 30, 2018

(65) Prior Publication Data

US 2020/0034312 A1    Jan. 30, 2020

(51) Int. Cl.
*G06F 12/14* (2006.01)
*G06F 12/084* (2016.01)

(52) U.S. Cl.
CPC ........ *G06F 12/1458* (2013.01); *G06F 12/084* (2013.01); *G06F 2212/656* (2013.01)

(58) Field of Classification Search
CPC .... G06F 12/1458; G06F 12/084; G06F 12/02; G06F 12/0215; G06F 12/0284; G06F 12/0802; G06F 12/0806; G06F 12/0871; G06F 12/08; G06F 2212/656
See application file for complete search history.

(56) References Cited

U.S. PATENT DOCUMENTS

| | | | |
|---|---|---|---|
| 5,193,167 A * | 3/1993 | Sites ...................... | G06F 9/383 711/163 |
| 6,549,989 B1 | 4/2003 | Arimilli et al. | |
| 6,625,701 B1 | 9/2003 | Arimilli et al. | |
| 6,801,986 B2 | 10/2004 | Steely, Jr. et al. | |
| 7,200,717 B2 | 4/2007 | Guthrie et al. | |
| 7,480,771 B2 | 1/2009 | Moir et al. | |
| 7,620,954 B2 | 11/2009 | Mattina et al. | |
| 9,390,026 B2 | 7/2016 | Guthrie et al. | |
| 9,396,127 B2 | 7/2016 | Guthrie et al. | |

(Continued)

*Primary Examiner* — Michael Krofcheck
(74) *Attorney, Agent, or Firm* — David Quinn; Brian F. Russell

(57) ABSTRACT

A data processing system includes multiple processing units all having access to a shared memory. A processing unit includes a processor core that executes memory access instructions including a store-conditional instruction that generates a store-conditional request specifying a store target address and store data. The processing unit further includes a reservation register that records shared memory addresses for which the processor core has obtained reservations and a cache that services the store-conditional request by conditionally updating the shared memory with the store data based on the reservation register indicating a reservation for the store target address. The processing unit additional includes a blocking state machine configured to protect the store target address against access by any conflicting memory access request during a protection window extension following servicing of the store-conditional request.

16 Claims, 11 Drawing Sheets

(56) References Cited

U.S. PATENT DOCUMENTS

| | | | | |
|---|---|---|---|---|
| 9,514,046 B1* | 12/2016 | Nowak | ................. | G06F 11/00 |
| 2003/0041225 A1* | 2/2003 | Mattina | ............... | G06F 12/0824 |
| | | | | 712/30 |
| 2006/0179253 A1* | 8/2006 | Fields, Jr. | ........... | G06F 12/0831 |
| | | | | 711/146 |
| 2008/0120625 A1* | 5/2008 | Clark | ................. | G06F 15/173 |
| | | | | 719/317 |
| 2008/0215824 A1* | 9/2008 | Goodman | ........... | G06F 12/0817 |
| | | | | 711/146 |
| 2011/0161590 A1* | 6/2011 | Guthrie | ............... | G06F 9/30087 |
| | | | | 711/122 |
| 2016/0364332 A1* | 12/2016 | Nowak | ................ | G06F 9/3004 |
| 2017/0293558 A1* | 10/2017 | Guthrie | ............... | G06F 12/0811 |

\* cited by examiner

```
loop:
    larx r1, var    ─202
    add r1, 1       ─204
    stcx var, r1    ─206
    beq loop        ─208
...
```

FIG. 2A

```
                    ⎫
loop:               ⎪
    load r1, lock   ─220
    cmp r1, 1       ─222  ⎬─212
    beq loop        ─224  ⎪
                    ⎭
    larx r1, lock   ─230  ⎫
    cmp r1, 1       ─232  ⎪
    beq loop        ─234  ⎪
    li r2, 1        ─236  ⎬─214
    stcx lock, r2   ─238  ⎪
    beq loop        ─239  ⎭ barrier         ─240  ⎫
    ...             ─242  ⎪
    (critical section     ⎬─216
    instructions)         ⎪
    ...                   ⎪
    barrier         ─244  ⎭ li r2, 0        ─250  ⎫─218
    store lock, r2  ─252  ⎭
...
```

FIG. 2B

SYNCHRONIZED ACCESS TO SHARED MEMORY BY EXTENDING PROTECTION FOR A STORE TARGET ADDRESS OF A STORE-CONDITIONAL REQUEST

BACKGROUND OF THE INVENTION

The present invention relates in general to data processing system and, in particular, to managing accesses to data in shared memory of a data processing system. Still more particularly, the present invention relates to a processor, data processing system and method for synchronizing accesses to data in a shared memory.

In shared memory multiprocessor (MP) data processing systems, each of the multiple processors in the system may access and modify data stored in the shared memory. In order to synchronize access to a particular granule (e.g., cache line) of memory between multiple processing units and threads of execution, load-reserve and store-conditional instruction pairs are often employed. For example, load-reserve and store-conditional instructions have been implemented in the POWER® instruction set architecture with request codes (opcodes) associated with various mnemonics, referred to herein generally as LARX and STCX. The goal of load-reserve and store-conditional instruction pairs is to load and modify data and then to commit the modified data to coherent memory only if no other thread of execution has modified the data in the interval between the load-reserve and store-conditional instructions. Thus, a read-modify-write operation targeting shared memory can be emulated without the use of an atomic update primitive that strictly enforces atomicity.

BRIEF SUMMARY

According to at least one embodiment, a data processing system includes multiple processing units all having access to a shared memory. A processing unit includes a processor core that executes memory access instructions including a store-conditional instruction that generates a store-conditional request specifying a store target address and store data. The processing unit further includes a reservation register that records shared memory addresses for which the processor core has obtained reservations and a cache that services the store-conditional request by conditionally updating the shared memory with the store data based on the reservation register indicating a reservation for the store target address. The processing unit additional includes a blocking state machine configured to protect the store target address against access by any conflicting memory access request during a protection window extension following servicing of the store-conditional request.

BRIEF DESCRIPTION OF THE SEVERAL VIEWS OF THE DRAWINGS

FIG. 2A depicts a first exemplary instruction sequence that employs load-reserve and store-conditional instructions to synchronize access to shared memory;

FIG. 2B illustrates a second exemplary instruction sequence that employs load-reserve and store-conditional instructions to coordinate execution of a critical section of a multithreaded program;

DETAILED DESCRIPTION

Figure 1A:
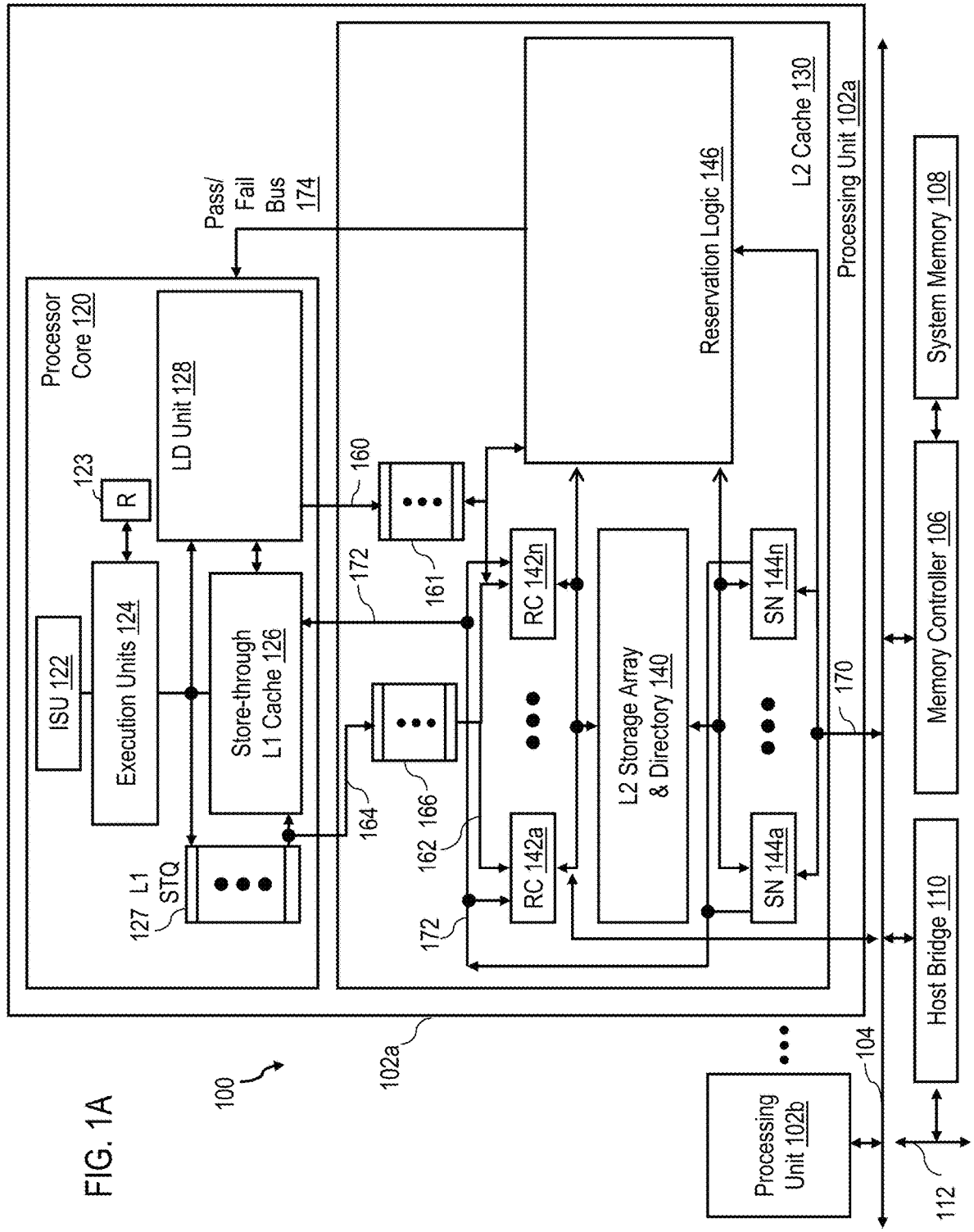
FIG. 1A is a high level block diagram of an illustrative data processing system in accordance with one embodiment.

With reference now to the figures and in particular with reference to FIG. 1A, there is illustrated a high level block diagram of a data processing system 100 in accordance with one embodiment. As shown, data processing system 100 includes multiple processing units 102 (including at least processing units 102a-102b) for processing data and instructions. Processing units 102 are coupled for communication to a system interconnect 104 for conveying address, data and control information between attached devices. In the depicted embodiment, these attached devices include not only processing units 102, but also a memory controller 106 providing an interface to a shared system memory 108 and one or more host bridges 110, each providing an interface to a respective mezzanine bus 112. Mezzanine bus 112 in turn provides slots for the attachment of additional unillustrated devices, which may include network interface cards, I/O adapters, non-volatile memory, non-volatile storage device adapters, additional bus bridges, etc.

As further illustrated in FIG. 1A, each processing unit 102, which may be realized as a single integrated circuit, includes one or more processor cores 120 (of which only one is explicitly shown) for processing instructions and data. Each processor core 120 includes an instruction sequencing unit (ISU) 122 for fetching and ordering instructions for execution, one or more execution units 124 for executing instructions dispatched from ISU 122, and a set of registers 123 for temporarily buffering data and control information. The instructions executed by execution units 124 include load-reserve and store-conditional instructions, which are utilized to synchronize access to shared memory between a particular thread of execution and other concurrent threads of execution, whether executing in the same processor core 120, a different processor core 120 in the same processing unit 102, or in a different processing unit 102. In a preferred embodiment, execution units 124 execute at least load-reserve and store-conditional instructions in-order (other instructions may or may not be executed out-of-order).

Each processor core 120 further includes an L1 store queue (STQ) 127 and a load unit 128 for managing the completion of store and load requests, respectively, corresponding to executed store and load instructions (including load-reserve and store-conditional instructions). In a preferred embodiment, L1 STQ 127 is implemented as a First-In, First-Out (FIFO) queue containing a plurality of queue entries. Store requests are accordingly loaded in the "top" entry of L1 STQ 127 at execution of the corresponding store instruction to determine the target address, and are initiated when the store request reaches the "bottom" or "commit" entry of L1 STQ 127.

It is important to note that the present application makes a distinction between "instructions", such as load-reserve and store-conditional instructions, and "requests." Load and store "instructions" (including load-reserve and store-conditional instructions) are defined herein as inputs to an execution unit that include an request code (opcode) identifying the type of instruction and one or more operands specifying data to be accessed and/or its address. Load and store "requests," including load-reserve and store-conditional requests, are defined herein as data and/or signals generated following instruction execution that specify at least the target address of data to be accessed. Thus, load-reserve and store-conditional requests may be transmitted from a processor core 120 to the shared memory system to initiate data accesses, while load-reserve and store-conditional instructions are not.

The operation of processor core 120 is supported by a multi-level volatile memory hierarchy having, at its lowest level, shared system memory 108, and at its upper levels two or more levels of cache memory, which in the illustrative embodiment include a L1 cache 126 and a L2 cache 130. As in other shared memory multiprocessor data processing systems, the contents of the memory hierarchy may generally be accessed and modified by threads of execution executing in any processor core 120 in any processing unit 102 of data processing system 100.

In accordance with one embodiment, L1 cache 126, which may include bifurcated L1 data and instruction caches, is implemented as a store-through cache, meaning that the point of cache coherency with respect to other processor cores 120 is located below L1 cache 126 and, in the depicted embodiment, is located at store-in L2 cache 130. Accordingly, as described above, L1 cache 126 does not maintain true cache coherency states (e.g., Modified, Exclusive, Shared, Invalid) for its cache lines, but only maintains valid/invalid bits. Because L1 cache 126 is implemented as a store-through cache, store requests first complete relative to the associated processor core 120 in L1 cache 126 and then complete relative to other processing units 102 at a point of system-wide coherency, which in the depicted embodiment is L2 cache 130.

As further illustrated in FIG. 1A, L2 cache 130 contains a storage array and directory 140 that store cache lines of instructions and data in association with their respective memory addresses and coherence states. L2 cache 130 also includes a number of read-claim (RC) state machines 142a-142n for independently and concurrently servicing memory access requests received from the associated processor cores 120. RC machines 142 receive core load requests from LD unit 128 in processor core 120 via load bus 160, an in-order L2 load queue (LDQ) 161, and command bus 162. Similarly, RC machines 142 receive core store requests from L1 STQ 127 in processor core 120 via store bus 164, an in-order L2 store queue (STQ) 166, and command bus 162.

L2 cache 130 further includes a number of snoop (SN) state machines 144a-144n for servicing memory access and other requests received from other processing units 102 via system interconnect 104 and snoop bus 170. SN machines 144 and RC machines 142 are each connected to a back-invalidation bus 172 by which any SN machine 144 or RC machine 142 can signal the invalidation of a cache line to processor core 120.

It is important to note that in a preferred embodiment L2 cache 130 is constructed such that at most a single one of RC machines 142 and SN machines 144 can be active servicing a request targeting a given target cache line address at any one time. Consequently, if a second request is received while a first request targeting the same cache line is already being serviced by an active RC machine 142 or SN machine 144, the later-in-time second request must be queued or rejected until servicing of the first request is completed and the active state machine returns to an idle state.

L2 cache 130 finally includes reservation logic 146 for recording reservations of the associated processor core 120. Reservation logic 146 supplies pass and fail indications indicating the success or failure of store-conditional (STCX) requests to processor cores 120 via pass/fail bus 174. Exemplary embodiments of reservation logic 146 are described in greater detail below with reference to FIGS. 1B-1C.

Those skilled in the art will additionally appreciate that data processing system 100 of FIG. 1A can include many additional non-illustrated components, such as interconnect bridges, non-volatile storage, ports for connection to networks or attached devices, etc. Because such additional components are not necessary for an understanding of the described embodiments, they are not illustrated in FIG. 1A or discussed further herein. It should also be understood, however, that the enhancements described herein are applicable to cache coherent data processing systems of diverse architectures and are in no way limited to the generalized data processing system architecture illustrated in FIG. 1A.

Multiprocessor data processing systems such as data processing system 100 of FIG. 1A implement a memory consistency model that specifies the legal possible executions of a given multiprocessor program with respect to memory accesses (e.g., among other things, the values that may be returned by load instructions, the order of writes to memory, those instruction execution dependencies that affect the ordering of memory accesses, and the final values for memory locations at the conclusion of a multiprocessor program). A memory consistency model is specified by two major characteristics: ordering of memory access requests and atomicity of store requests.

The ordering of memory requests specifies how memory requests may, if at all, be re-ordered relative to the order of their respective load and store instructions in the individual threads of execution in the multiprocessor program. Memory consistency models must define ordering of memory access requests in four general cases: (1) ordering of the memory requests for a load instruction to a following load instruction, (2) ordering of the memory requests for a load instruction to a following store instruction, (3) ordering of the memory requests for a store instruction to a following store instruction, and (4) ordering of the memory requests for a store instruction to a following load instruction. Strong consistency memory models will, in general, preserve all or at least most of these orderings. In particular, many strong consistency memory models enforce the first three orderings, but do not enforce store-to-load ordering. Weak consistency memory models will generally not enforce most or all of these orderings.

Atomicity of store requests refers to whether or not a given thread of execution can read the value of its own store request before other threads, and furthermore, whether the value written to the distributed shared memory system by the store request becomes visible to other threads in a logically instantaneous fashion or whether the value can become visible to other threads at different points in time. A memory consistency model is called "multi-copy atomic" if the value written by a store request of one thread becomes visible to all other threads in a logically instantaneous fashion. In general, strong consistency memory models are multi-copy atomic, and weak consistency memory models do not enforce multi-copy atomicity.

In a given multiprocessor program, program semantics often require that multi-copy atomicity and/or the various orderings between memory access requests are respected. Therefore, in an exemplary embodiment of data processing system 100, in which the distributed shared memory system implements a weak consistency memory model, so called "barrier" (e.g., SYNC) instructions are typically provided to allow the programmer to specify what memory access request orderings and atomicity are to be applied during execution of the multiprocessor program. In particular, a barrier instruction causes the distributed shared memory system to perform any memory accesses initiated by instructions preceding the barrier instruction prior to any memory accesses initiated by instructions following the barrier instruction.

Figure 1B:
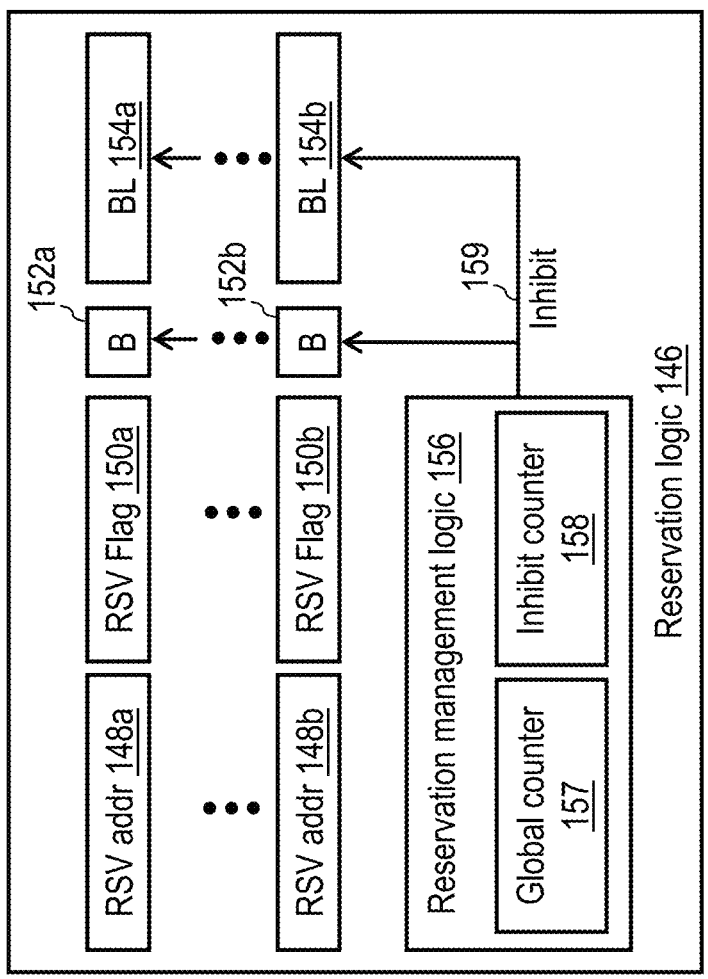
FIG. 1B is a more detailed view of the reservation logic of FIG. 1A in accordance with one embodiment.

Referring now to FIG. 1B, there is depicted a more detailed block diagram of reservation logic 146 of FIG. 1 in accordance with one embodiment. In the illustrated embodiment, reservation logic 146 includes, for each hardware thread that may be concurrently executed by the associated processor core 120, a respective reservation register comprising a reservation address field 148 and a reservation flag 150. In the depicted example, which assumes that processor core 120 can each execute two concurrent hardware threads, reservation logic 146 includes two reservation registers: reservation address field 148a and reservation flag 150a for thread 0 and reservation address field 148b and reservation flag 150b for thread 1. When set (e.g., to '1'), a reservation flag 150 indicates that the corresponding thread holds a reservation for the address contained in the associated reservation address field 148 and otherwise indicates no reservation is held.

Reservation logic 146 additionally includes per-thread blocking (B) flags 152a-152b and blocking (BL) state machines 154a-154b, as well as reservation management logic 156 that controls the setting of B flags 152 and the operation of BL state machines 154 via an inhibit signal 159. As described further below with reference to FIGS. 7 and 8, if not inhibited by the assertion of inhibit signal 159, each BL state machines 154 can extend the protection window applied to a respective store target address of a store-conditional (STCX) request to increase the likelihood that a subsequent local STCX request of the associated thread to the same store target address will succeed, even in the presence of contention between hardware threads for the store target address. Reservation management logic 156 regulates the duration for which it will permit BL state machines 154 to provide extended protection of storage target address of STCX requests by reference to a global counter 157. Reservation management logic 156 regulates the duration for which it will inhibit BL state machines 154 from providing extended protection of storage target address of STCX requests by reference to an inhibit counter 158.

Figure 1C:
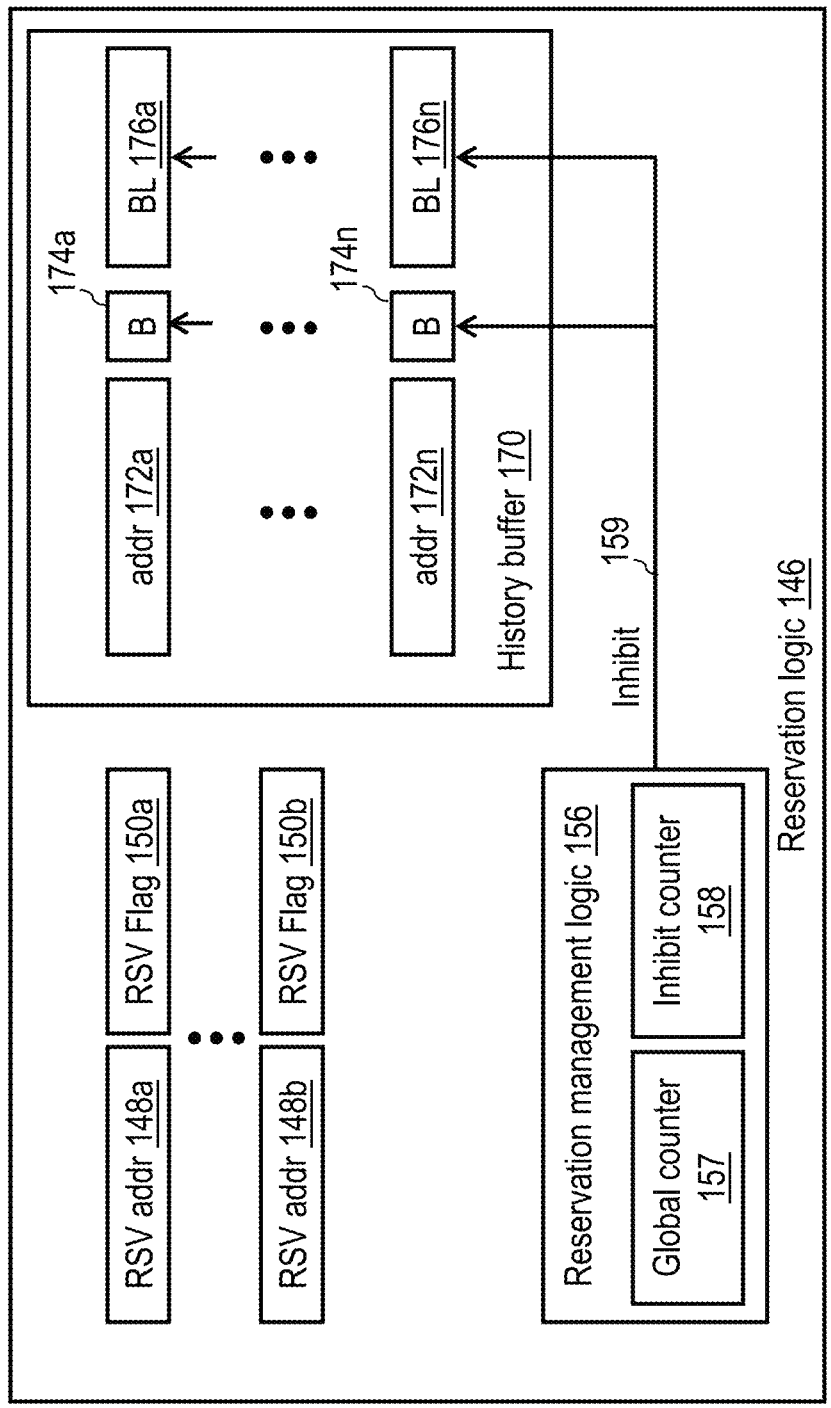
FIG. 1C is a more detailed view of the reservation logic of FIG. 1A in accordance with another embodiment.

FIG. 1C illustrates an alternative embodiment of reservation logic 146 that replaces the per-thread B flags 152 and BL state machines 154 in the embodiment of FIG. 1B with a history buffer 170. History buffer 170, if implemented, can be realized utilizing a variety of different data structures and can be managed utilizing a variety of different management policies. For example, in a first implementation, history buffer 170 can include one shadow register per thread that is loaded with the address specified in the associated thread's RSV address register 148 upon successful completion of a STCX request to that address. Each such shadow register has an associated B flag 174 and a BL state machine 176 as discussed above with reference to FIG. 1B. In a second implementation (shown in FIG. 1C), history buffer 170 can alternatively be realized as a N-deep FIFO buffer that stores that last N store target addresses of successful core STCX requests of any thread (regardless of duplication of store target addresses). In this implementation, each of the N entries of history buffer 170 includes an address register 172 for buffering the store target address of a successful STCX request transferred from one of RSV address registers 148a-148b, as well as a B flag 174 and a BL state machine 176 as discussed above with reference to FIG. 1B. In a third implementation, history buffer 170 can be realized as a FIFO buffer as in the second implementation, but additionally includes a comparator per entry to ensure that all store target addresses inserted into history buffer 170 are unique. Additional embodiments of and management policies for history buffer 170 will be apparent to those skilled in the art.

Referring now to FIG. 2A, there is depicted a first exemplary instruction sequence 200 that employs load-reserve and store-conditional instructions to synchronize access to shared memory. In particular, instruction sequence 200 is utilized to update the value of a variable in shared memory.

Instruction sequence 200 begins with a LARX instruction 202 that loads the value of the variable (i.e., var) from shared memory into a private register r1 in the processor core executing the instruction. The value of the variable is then updated locally in register r1, in this case, by an ADD instruction 204 incrementing the value of the variable by 1. The new value of the variable is then conditionally stored back into shared memory by STCX instruction 206. The success or failure of STCX instruction 206 in updating the value of the variable in shared memory is reflected in a condition code register (e.g., one of registers 123) in the processor core. Conditional branch instruction 208 then tests the condition code found in the condition code register and conditionally redirects execution based on the success or failure of STCX instruction 206. If the relevant bit(s) of the condition code register is/are equal to zero, indicating that the conditional update to the variable indicated by STCX instruction 206 failed (e.g., due to an intervening storage-modifying access to the variable by another thread between execution of LARX instruction 202 and STCX instruction 208), instruction sequence 200 will be repeated, and execution branches from conditional branch instruction 208 back to LARX instruction 202. If, however, the conditional update indicated by STCX instruction 206 succeeds, the condition code will be non-zero, and processing will continue with the next sequential instruction following instruction sequence 200.

With reference now to FIG. 2B, there is illustrated a second exemplary instruction sequence 210 that employs load-reserve and store-conditional instructions to coordinate execution of a critical section of a multithreaded program. As indicated, instruction sequence 210 includes, in program order, a polling instruction sequence 212, lock acquisition sequence 214, critical section 216, and lock release sequence 218.

As is known in the art, critical section 216 is, by definition, a portion of a program that includes accesses to a shared resource (e.g., a shared in-memory data set) that must not be concurrently accessed by more than one thread of the multiprocessor program. In order to keep the various hardware threads from making concurrent accesses to the shared resource, the multithreaded program bounds critical section 206 with barrier instructions 240, 244 that order execution of instructions within critical section 216 with respect to both instructions in the same thread that are outside critical section 216. In addition, the multiprocessor program ensures that not more than one thread at a time enters into a critical section by implementing a lock to which access is synchronized by load-reserve and store-conditional instructions.

In particular, a thread attempts to acquire the lock needed to enter critical section 216 through execution of lock acquisition sequence 214. Lock acquisition sequence 214 begins with a LARX instruction 230 that loads the value of the lock variable (i.e., lock) from shared memory into a private register r1 (e.g., one of registers 123) in the executing processor core. The value of the lock variable is then tested by compare instruction 232 to determine whether or not the lock is currently in a locked state (i.e., the lock is held by another thread). If so, conditional branch instruction 234 causes execution to return to the beginning of polling instruction sequence 212 (which is described in greater detail below). If a determination that the lock is not currently held by another thread, a LOAD immediate instruction 236 places a value of '1' (representing a locked state) into a register r2. A STCX instruction 238 then conditionally updates the lock variable in shared memory to the locked state, thus securing the lock for the executing thread. As before, the success or failure of the STCX instruction in updating the value of the lock variable in shared memory is reflected in a condition code register in the processor core. Conditional branch instruction 239 tests the condition code found in the condition code register and conditionally redirects execution based on the success or failure of STCX instruction 238. If the relevant bit(s) of the condition code register is/are equal to zero, indicating that the conditional update to the lock variable indicated by STCX instruction 238 failed (e.g., due to an intervening storage-modifying access to the lock variable by another thread between execution of LARX instruction 230 and STCX instruction 238), instruction sequence 210 will be repeated from the beginning of instruction polling sequence 212. If, however, the conditional update to the lock variable indicated by STCX instruction 238 succeeds, the condition code will be non-zero, and processing will proceed sequentially to critical section 216. Once critical section 216 completes, the thread will release the lock by updating the lock variable in shared memory by executing a lock release sequence 218 including a LOAD immediate instruction 250 that loads register r2 with a value of '0' (representing an unlocked state) and a STORE instruction 252 that updates the lock variable in shared memory with this value. Thereafter, execution of the thread proceeds to subsequent instructions, if any.

Although a multiprocessor program could be implemented with only lock acquisition sequence 214, critical section 216, and lock release sequence 218 (i.e., omitting polling instruction sequence 212), in practice such a multiprocessor program would not efficiently utilize the resources of a processing unit, such as a processing unit 102 in FIG. 1A. In particular, LARX instruction 230, which is utilized to load the lock value and set the reservation for the lock address upon which the execution of STCX instruction 238 depends, is generally a resource-intensive instruction. Irrespective of the chosen implementation of the cache hierarchy, a LARX instruction requires communication with the coherence point of the cache hierarchy, and in implementations in which that the coherence point is not in the L1 cache, this communication results in the LARX instruction being more resource-intensive than a corresponding LOAD instruction. For example, in the current embodiment, regardless of whether the target address of LARX instruction 230 hits or misses in L1 cache 126, execution of LARX instruction 230 requires allocation of an entry in L2 LDQ 161, dispatch of an RC machine 142 in L2 cache 130, and update of reservation logic 146. Consequently, it is desirable that the thread iterate on a load target address using a less resource-intensive LOAD instruction rather than a more resource-intensive a LARX instruction.

Therefore, it is common for lock acquisition sequence 214 to be proceeded by a polling instruction sequence 212. Polling instruction sequence 212, which is constructed very similarly to the beginning of lock acquisition sequence 214, includes a polling LOAD instruction 220 (rather than a LARX instruction) that loads the lock value from shared memory, a compare instruction 222 that compares the lock value to a value of '1' (indicating a locked state), and a conditional branch instruction 224 that returns execution back to polling LOAD instruction 220 until the lock is found to be in the unlocked state. It is advantageous to employ polling LOAD instruction 220 to poll on the lock variable rather than a LARX instruction since a hit on the target address of polling LOAD instruction 220 in L1 cache 126 will not require utilization of any of the limited resources of L2 cache 130 (e.g., L2 LDQ 161, RC machines 142, and reservation logic 146).

In multithreaded programs that include instruction sequences such as instruction sequences 200 and 210, it is common for a hardware thread to execute multiple STCX instructions targeting the same store target address. For example, in the multithreaded program including instruction sequence 210, a hardware thread may need to acquire the same lock multiple times in order to execute various different critical sections of code. Because the target cache lines identified by STCX requests are commonly highly contended, it is not uncommon for these cache lines to bounce back and forth between the caches of various processing units, leading to significant traffic on the system interconnect and execution inefficiency due to the conditional updates to shared memory indicated by the STCX requests being attempted multiple times prior to succeeding. In accordance with the described inventions, synchronized access to shared memory is improved by extending the protection window for a store target address of a STCX request, thus increasing the probability that a subsequent local STCX request will succeed without having to obtain the target cache line from another processing unit.

Figure 3:
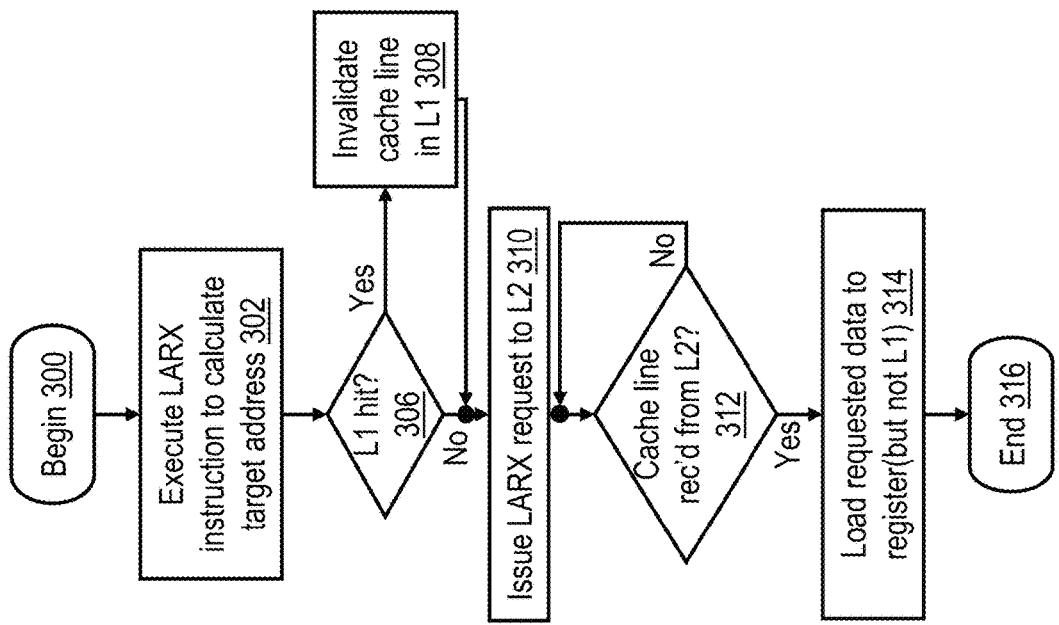
FIG. 3 is a high level logical flowchart of an exemplary method of processing a load-reserve instruction in a processor core in accordance with one embodiment.

With reference now to FIG. 3, there is depicted a high level logical flowchart of an exemplary method by which a processor core 120 of data processing system 100 processes a load-reserve (LARX) instruction in accordance with one embodiment. As shown, the process begins at block 300 and thereafter proceeds to block 302, which illustrates execution units 124 receiving a LARX instruction from ISU 122 and then executing the LARX instruction to calculate the load target address. In a preferred embodiment, execution units 124 execute LARX instructions within a hardware thread in-order and without pipelining, meaning that the data words(s) requested by a LARX instruction must be loaded to one or more registers 123 in processor core 120 before the next LARX or STCX instruction begins execution. These restrictions simplify the management of reservations by reservation logic 146 in L2 cache 130.

Following execution of the LARX instruction, an indication of the instruction type, a thread identifier, and the load target address calculated by execution of the LARX instruction are received from execution units 124 by LD unit 128. At block 306, LD unit 128 determines whether or not the load target address of the LARX instruction resides in L1 cache 126. If so, LD unit 128 invalidates the cache line containing the load target address in L1 cache 126 (block 308). Those skilled in the art should appreciate that the invalidation of the cache line containing the load target address in L1 cache 126 is a simplifying design choice and that in other embodiments the cache line containing the load target address need not be invalidated in L1 cache 126. Following block 308 or in response to determining that the load target address of the LARX instruction missed in L1 cache 126, LD unit 128 issues a LARX request to L2 cache 130 via load bus 160 (block 310). The LARX request includes, for example, an indication of the request type, the load target address, and an identifier of the issuing thread. After buffering the LARX request in L2 LDQ 161, L2 cache 130 dispatches the LARX request to an RC machine 142 for servicing, as described further below with reference to FIG. 4.

Next, at block 312, LD unit 128 awaits return of the requested cache line identified by the load target address from L2 cache 130. In response to receipt of the requested cache line, LD unit 128 transfers the data word(s) associated with the load target address into a core register 123, but does not cache the requested cache line in L1 cache 126 (block 314). It should be appreciated that in an alternative embodiment that does not invalidate the requested cache line at block 308, the requested cache line can instead be cached in L1 cache 126 to permit subsequent loads (including subsequent load-reserve requests), to hit in L1 cache 126. Following block 314, the process of FIG. 3 terminates at block 316.

Figure 4:
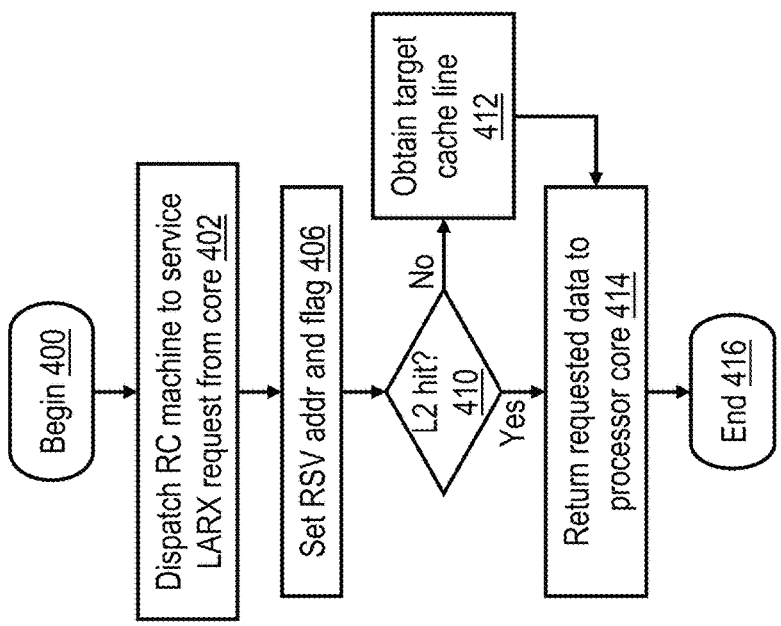
FIG. 4 is a high level logical flowchart of an exemplary method of processing a load-reserve request in a lower level cache in accordance with one embodiment.

Referring now to FIG. 4, there is depicted a high level logical flowchart of an exemplary method by which an L2 cache 130 of data processing system 100 processes a load-reserve (LARX) request in accordance with one embodiment. The process begins at block 400 and then proceeds to block 402, which depicts L2 cache 126 dispatching an RC machine 142 to service a next LARX request of the associated processor core 120 that is enqueued in L2 LDQ 161. As illustrated at block 406, RC machine 142 establishes a reservation for the load target address in L2 cache 130 in the reservation register of the appropriate thread by placing the load target address in the appropriate reservation address field 148 and setting the associated reservation flag 150.

At block 410, RC machine 142 additionally determines whether or not the load target address of the LARX request hit in L2 storage array and directory 140. If so, the process passes directly to block 414. If not, RC machine 142 issues one or more requests on system interconnect 104 in order to obtain a copy of the requested cache line from another cache hierarchy or system memory 108 (block 412). Following block 412, the process proceeds to block 414, which depicts RC machine 142 returning the requested cache line to the associated processor core 120. Thereafter, the RC machine 142 servicing the LARX request transitions from the busy state to the idle state, and the process of FIG. 4 ends at block 416.

Figure 5:
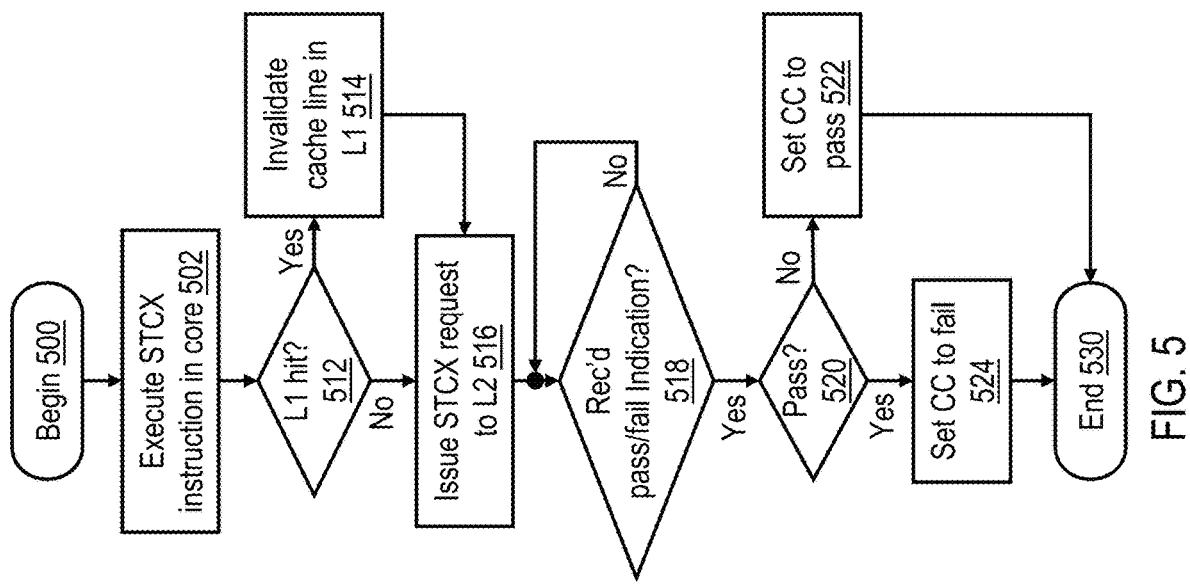
FIG. 5 is a high level logical flowchart of an exemplary method of processing a store-conditional instruction in a processor core in accordance with one embodiment.

With reference now to FIG. 5, there is illustrated a high level logical flowchart of an exemplary method of processing a store-conditional (STCX) instruction in a processor core in accordance with one embodiment. As depicted, the process begins at block 500 and thereafter proceeds to block 502, which illustrates execution units 124 receiving a STCX instruction from ISU 122 and then executing the store-type instruction to calculate a store target address. As with the LARX execution described above, execution units 124 also preferably execute STCX instructions appearing in the same hardware thread in-order and without pipelining with respect to both LARX and STCX instructions.

Upon execution of the STCX instruction, execution units 124 place a corresponding store-type request including the store target address calculated by execution of the STCX instruction, a thread identifier, and the store data specified by the operands of the STCX instruction within L1 STQ 127. In one preferred embodiment, L1 STQ 127 is implemented as a shared FIFO queue that buffers and orders store requests of all threads executing within processor unit 102. When the STCX request corresponding to the executed STCX instruction reaches the bottom or commit entry of L1 STQ 127, L1 STQ 127 determines at block 512 whether or not the store target address of the STCX request hits in L1 cache 126. If so, L1 STQ 127 invalidates the target cache line held in L1 cache 126 (block 514). Following block 514 or in response to the store target address missing in L1 cache 126 at block 512, L1 STQ 127 issues the STCX request to L2 STQ 166 of L2 cache 130 via store bus 164 (block 516). L1 STQ 127 then awaits return via pass/fail bus 174 of a pass or fail indication for the STCX request indicating whether or not the STCX request succeeded in updating L2 cache 130 (block 518). In response to receipt of the pass or fail indication via pass/fail bus 174, processor core 120 provides the pass or fail indication to execution units 124 (e.g., to indicate whether the path of execution should change) and, as shown at block 520-524, updates a condition code register among registers 123 to indicate whether the STCX request passed or failed. Thereafter, the STCX request is deallocated from L1 STQ 127, and the process of FIG. 5 terminates at block 530.

Figure 6:
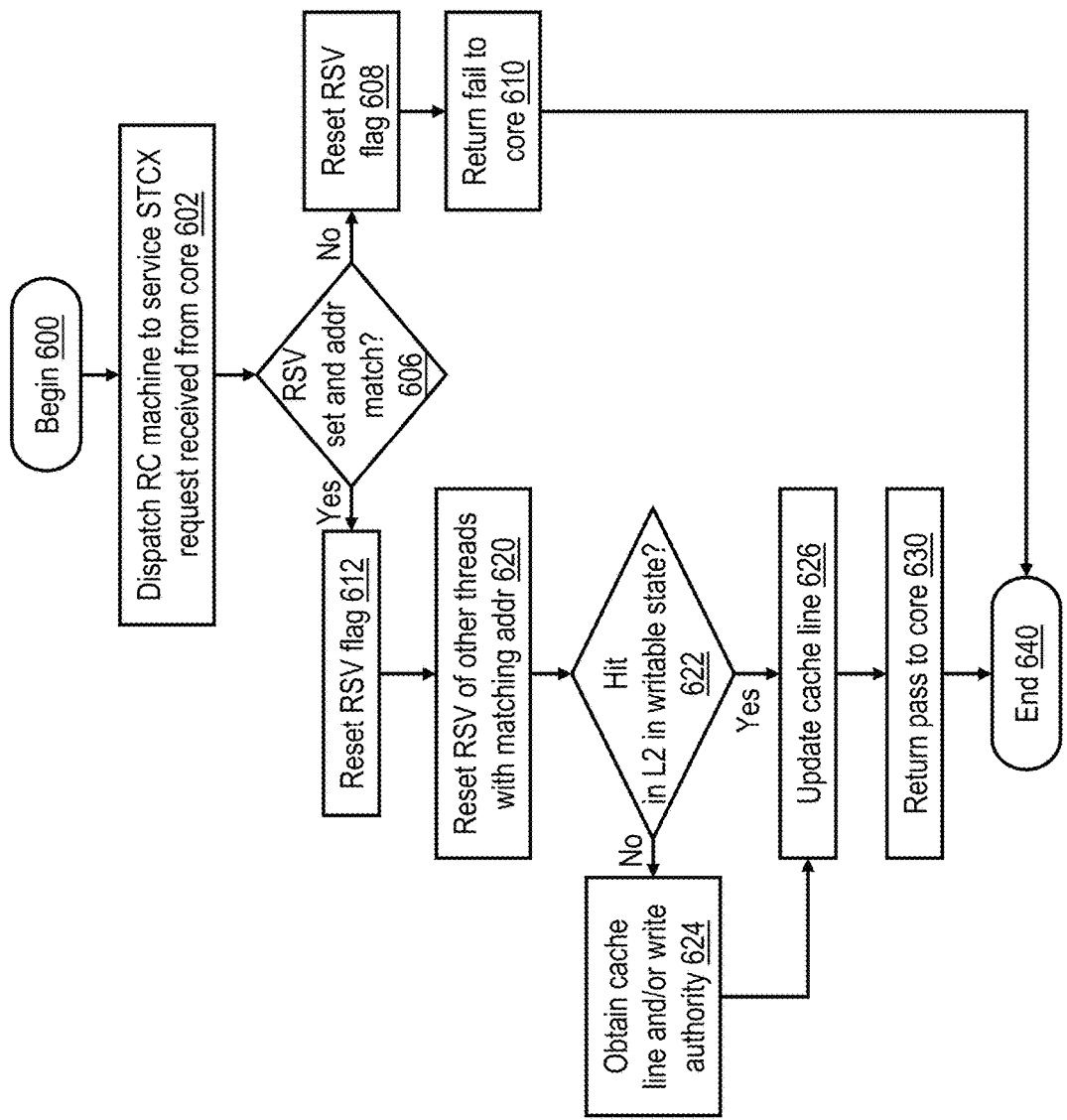
FIG. 6 is a high level logical flowchart of an exemplary method of processing a store-conditional request in lower level cache in accordance with one embodiment.

Referring now to FIG. 6, there is depicted a high level logical flowchart of an exemplary method of processing a store-conditional (STCX) request in a lower level cache in accordance with one embodiment. As described above, STCX requests are received by L2 cache 130 within L2 STQ 166 via store bus 164. In some embodiments, L2 STQ 166 may be implemented, like L1 STQ 127, as a FIFO queue. In such embodiments, the process begins at block 600 in response to receipt of a store-type request in the bottom entry of L2 STQ 166. The store request at the bottom entry of L2 STQ 166 will then be selected for dispatch to an idle RC machine 142 for processing, as shown at block 602.

In response to receipt of a STCX request for servicing, the dispatched RC machine 142 transitions from an idle state to the busy state. While in the busy state, the RC machine 142 protects the store target address of the STCX request against any conflicting access to the same store target address executing on another hardware thread of the same processing unit 102 or a different processing unit 102. The process of FIG. 6 proceeds from block 602 to block 606, which illustrates the RC machine 142 determining whether or not the issuing thread has a valid reservation for the store target address by determining whether the thread's RSV flag 150 is set and the associated RSV register 148 specifies a reservation address matching the store target address. If not, RC machine 342 resets the RSV flag 150 of the issuing thread (block 608) and returns a fail indication to the processor core 120 via pass/fail bus 174 to report that the STCX request made no update to L2 cache 130 (block 610). Thereafter, the RC machine 142 allocated to service the STCX request returns to the idle state, and the process of FIG. 6 ends at block 640.

Returning to block 606, in response to RC machine 142 determining that the issuing thread has a valid reservation for the store target address of the STCX request, RC machine 142 resets the issuing thread's RSV flag 150 (block 612), as well as the RSV flag 150 of any other thread specifying a matching store target address in its associated RSV address register 148 (block 620). It should be noted that in this exemplary embodiment a STCX request only cancels the reservations of other threads at block 620 after it is verified at block 606 that the STCX is going to succeed in its conditional update of shared memory.

The process proceeds from block 620 to block 622, which illustrates RC machine 142 determining whether or not the store target address of the STCX request hits in L2 storage array and directory 140 in a "writeable" coherence state that confers authority on L2 cache 130 to modify the target cache line. If not, RC machine 142 obtains authority to modify the target cache line and, if necessary, a copy of the target cache line from another cache hierarchy or memory controller 106 by issuing one or more requests on system interconnect 104 (block 624). Following block 624 or in response to an affirmative determination at block 622, RC machine 142 updates the target cache line in L2 storage array and directory 140 with the store data of the store-type request (block 626). RC machine 142 additionally returns a pass indication to processor core 120 via pass/fail bus 174 to report successful update of the L2 cache 130 (block 630). Thereafter, RC machine 142 returns to the idle state, and the process of FIG. 6 ends at block 640.

Figure 7:
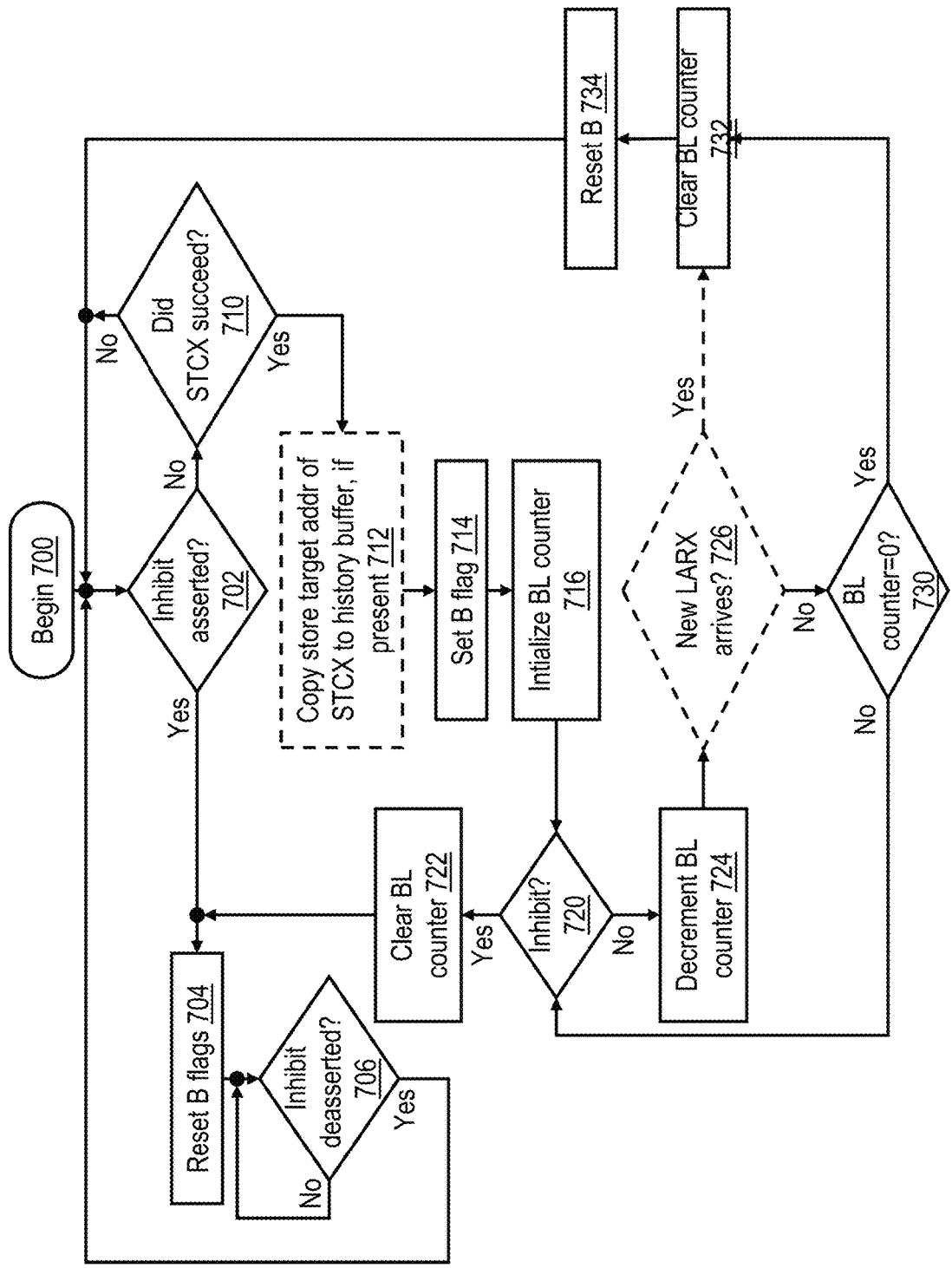
FIG. 7 is a high level logical flowchart of an exemplary method by which the protection window associated with the target address of a store-conditional request is extended in accordance with one embodiment.

With reference to FIG. 7, there is illustrated a high level logical flowchart of a method by which the protection window associated with the target address of a store-conditional (STCX) request is extended in accordance with one embodiment. The illustrated process can be performed, for example, by reservation logic 146 of FIG. 1B or FIG. 1C, in order to extend the protection window beyond that enforced by an RC machine 142 in accordance with the process of FIG. 6.

Figure 8:
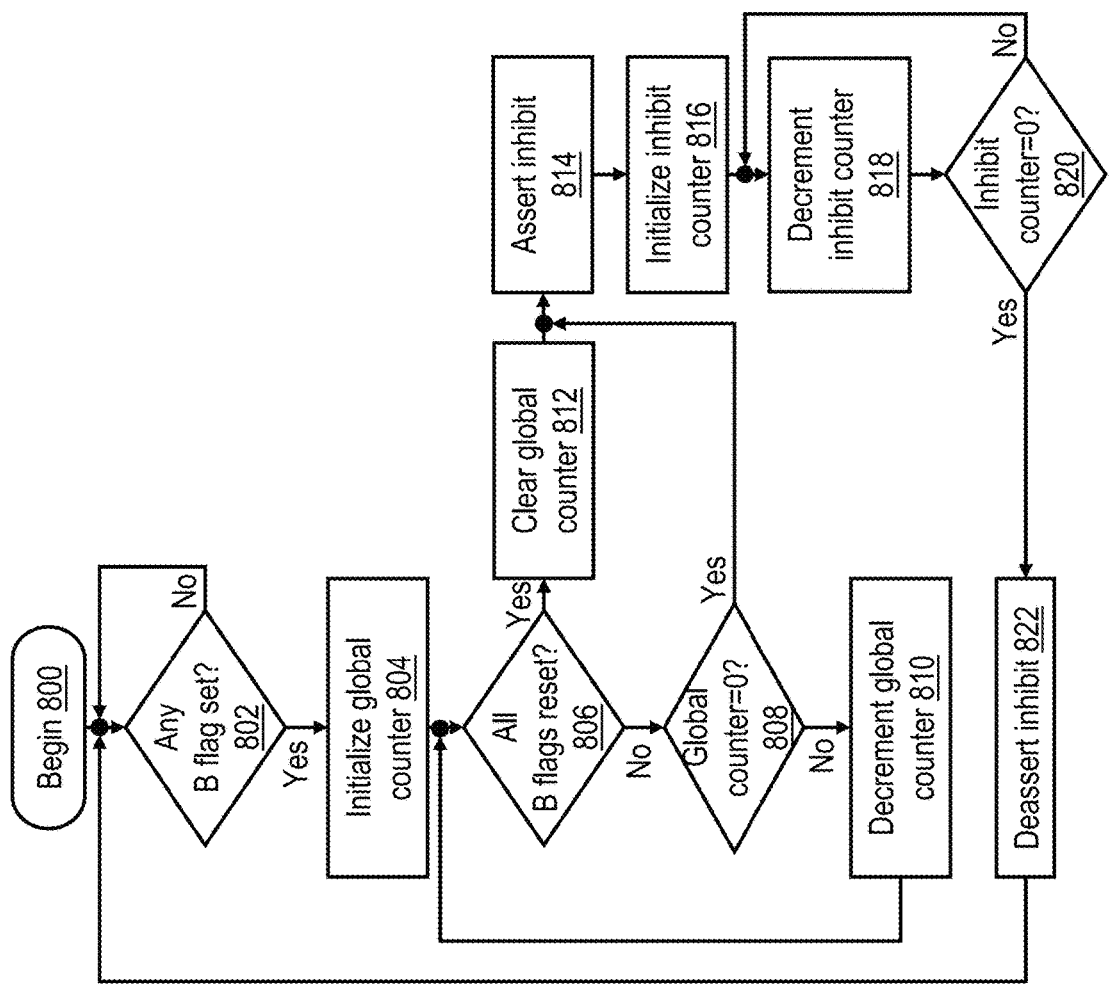
FIG. 8 is a high level logical flowchart of an exemplary method of controlling the ability of a processing unit to extend the protection windows associated with target addresses of store-conditional requests in accordance with one embodiment.

The process of FIG. 7 begins at block 700 and then proceeds to block 702, which illustrates a determination of whether or not inhibit signal 159 is asserted by reservation management logic 156 (i.e., whether or not inhibit signal 159 is active). When asserted, inhibit signal 159 inhibits extension of the protection window of any store target address by any BL state machine 152 or 174, thus allowing the hardware threads executing on other processing units 102 a greater opportunity to access and update target cache lines for which contention may exist. FIG. 8, which is described below, discloses one embodiment of how reservation management logic 156 determines the timing and duration of assertion of inhibit signal 159.

If a determination is made at block 702 that inhibit signal 159 is asserted, reservation logic 146 resets each B flag 152 (in FIG. 1B) or 174 (in FIG. 1C), if needed, as shown at block 704. Reservation logic 146 then awaits deassertion of inhibit signal 159 at block 706. In response to deassertion of inhibit signal 159, the process of FIG. 7 returns to block 702, which has been described.

If reservation logic 146 determines at block 702 that inhibit signal 159 is not asserted, meaning that reservation logic 146 is permitted to extend the protection windows applied to the store target addresses of STCX requests, reservation logic 146 determines at block 710 whether or not a local STCX request succeeded in updating shared memory, as discussed above with respect to block 630 of FIG. 6. If not, the process returns to block 702. In response to a local STCX request succeeding, the process of FIG. 7 proceeds from block 710 to block 712 (in embodiments like FIG. 1C in which a history buffer 170 is implemented) or block 714 (in embodiments like FIG. 1B in which a history buffer 170 is not implemented).

Block 712 illustrates reservation logic 146 copying the store target address of the successful STCX request from the relevant RSV address register 148 to an address register 172 of history buffer 170, if present. At block 714, reservation logic 146 sets the B flag 152 associated with the RSV address register 148 holding the store target address of the successful STCX request (in the embodiment of FIG. 1B) or the B flag 174 associated with the address register 172 holding the store target address of the successful STCX request (in the embodiment of FIG. 1C). Setting the B flag 152 or 174 at block 714 initiates transition of the associated BL state machine 154 or 176 from the idle to the active state, thus protecting the associated store target address from access by other hardware threads of the same or a different processing unit 102.

At block 716, the BL state machine 154 or 176 initializes a BL counter (in this example, a countdown counter) to an initial count value that corresponds to a duration of the extension of the protection window applied to the store target address following the conclusion of that provided by the RC machine 142 in the process of FIG. 6. At block 720, the BL state machine 154 or 176 determines whether inhibit signal 159 has been asserted. If so, the BL state machine 154 or 176 clears the BL counter, thus ending the protection window extension and returning the BL state machine 154 or 176 to the idle state (block 722). Thereafter, the process of FIG. 7 passes to block 704, which has been described.

Returning to block 720, if inhibit signal 159 is not asserted, the BL statement machine 154 or 176 decrements the BL counter (block 724). In embodiments including a history buffer 170, optional block 726 is omitted, and the process passes directly from block 724 to block 730, which illustrates the BL statement machine 154 or 176 checking to determine whether or not the BL counter has reached a value of zero (i.e., whether the maximum duration of the protection window extension has ended). If not, the process returns to block 720, which has been described. If, however, the BL counter has reached a count value of zero, the process proceeds from block 730 to block 732, which is described below. Returning to optional block 726, in embodiments omitting a history buffer 170, the busy BL state machine 154 may optionally determine whether L2 cache 130 has received a new LARX request from the associated processor core 120. If not, the process passes to block 730; if, however, a new LARX request from the associated processor core 120, the process passes from block 726 to block 732.

At block 732, the BL state machine 154 or 176 clears the BL counter, thus ending the protection window extension. In addition, BL state machine 154 or 176 resets its associated B flag 152 or 174 (block 734) and returns to the idle state. Thereafter, the process of FIG. 7 passes to block 702, which has been described.

Referring now to FIG. 8, there is depicted a high level logical flowchart of an exemplary method of controlling the ability of a processing unit to extend the protection windows associated with target addresses of store-conditional requests in accordance with one embodiment. The process given in FIG. 8 can be performed, for example, by reservation management logic 156.

The process of FIG. 8 begins at block 800 and then proceeds to block 802, which illustrates reservation management logic 156 determining whether or not any B flag 152 or 174 is set. If not, the process simply iterates at block 802. In response to a determination at block 802 that at least one B flag 152 or 174 is set, reservation management logic 156 initializes global counter 157 by setting it to a count value indicative of a maximum duration for which the local processing unit 102 is permitted to provide protection window extensions for the store target addresses of STCX requests.

As shown at blocks 806-808, the processing of reservation management logic 156 then enters a loop in which reservation management logic 156 monitors for the first to occur of two conditions: (1) all of all B flags 152 or 174 being reset, indicating that all active protection window extensions have now ended (as shown at block 806) or (2) the count value of global counter 157 reaching zero (block 808). In response to reservation management logic 156 determining at block 806 that all B flags have been reset, reservation management logic 156 clears global counter 157 (block 812), and the process passes to block 814. If, however, reservation management logic 156 determines at block 808 that global counter 157 has reached a count value of zero, the process passes directly to block 814. If neither of these conditions is detected, reservation management logic 156 decrements global counter 157 (block 810) and again makes the determinations depicted at blocks 806-808.

At block 814, reservation management logic 156 asserts inhibit signal 159, which as discussed with reference to block 702 of FIG. 7 prevents reservation logic 146 from extending the protection window provided for the storage target address of a local STCX request. Reservation management logic 814 also initializes inhibit counter 158 to a count value reflecting a duration for which it will inhibit reservation logic 146 from extending the protection window provided for the storage target address of any local STCX request (block 816). As indicated by blocks 818 and 820, reservation management logic 156 then iteratively decrements inhibit counter 158 until the period for inhibiting the extension of protection windows for the storage target address of any local STCX request has elapsed. In response to the elapse of this period, reservation management logic 156 deasserts inhibit signal 159 (block 822), and the process returns to block 802, which has been described.

Figure 9:
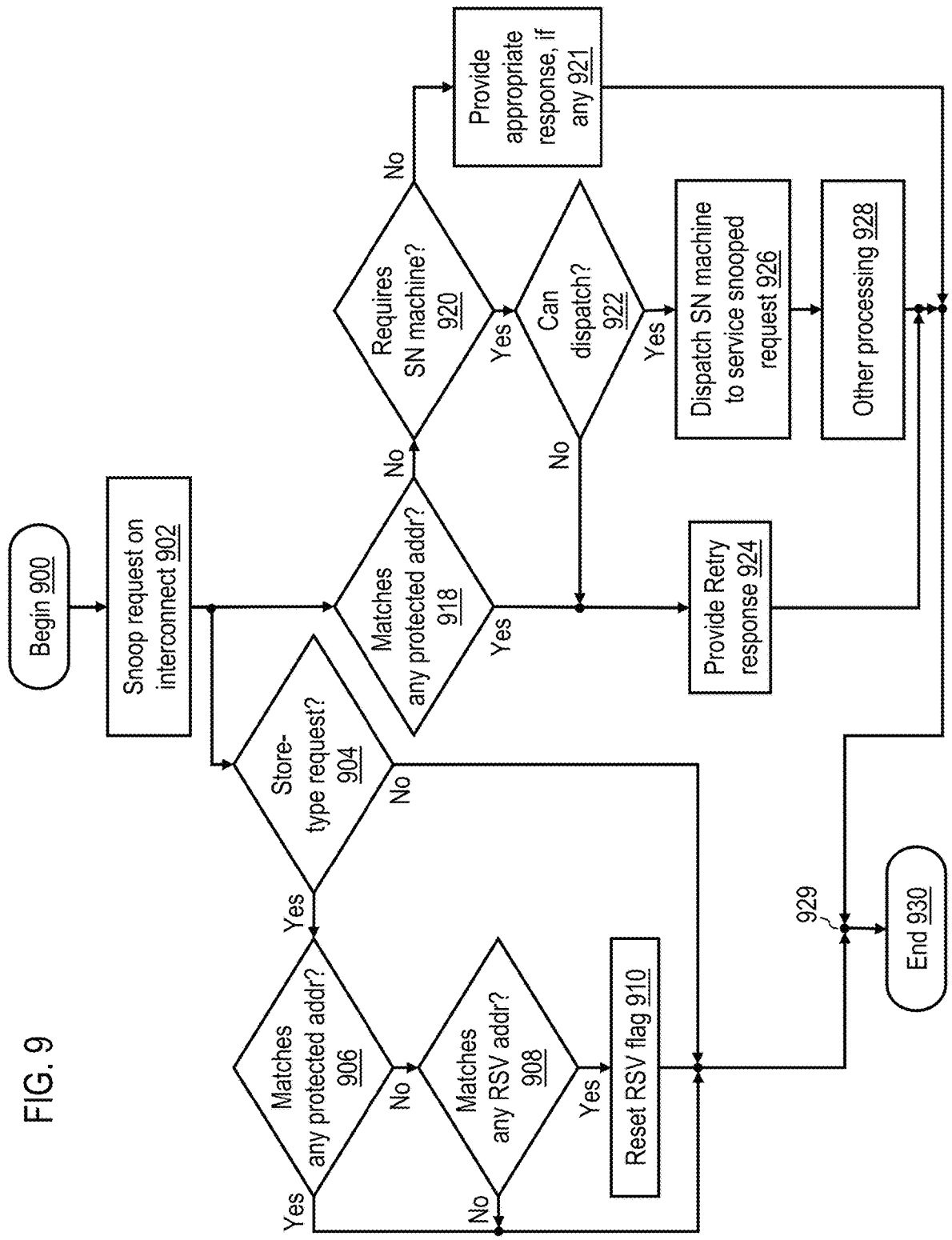
FIG. 9 is a high level logical flowchart of an exemplary method of processing a snooped request in accordance with one embodiment.

With reference now to FIG. 9, there is illustrated a high level logical flowchart of an exemplary method by which the L2 cache 130 of a processing unit 102 services a request snooped from a system interconnect in accordance with one embodiment. Those skilled in the art will appreciated that multiple instances of this process can be active in a given L2 cache 230 concurrently. As depicted, the process begins at block 900 and thereafter proceeds to block 902, which illustrates an L2 cache 130 snooping a request (e.g., issued by anther processing unit 102) on system interconnect 104 via snoop bus 170. Following block 902, the process of FIG. 9 bifurcates into two concurrent parallel subprocesses—a reservation update subprocess depicted at blocks 904-910 in which the affect, if any, of the snooped request on pending reservations tracked in the L2 cache 130 is managed, and a request servicing subprocess at blocks 918-928 in which the snooped request is serviced by the snooping L2 cache 130, if necessary. Following completion of both subprocesses, the two subprocesses merge at join point 929, and process of FIG. 9 ends at block 930.

Referring first to the reservation update subprocess, the snooping L2 cache 130 determines at block 904 whether or not the snooped request is a store-type request that modifies or requests authority to modify shared memory. If not, no update to any local reservation is required, and the reservation update subprocess proceeds to join point 929. If, however, the snooped request is a store-type request that indicates the intention to modify a target cache line, L2 cache 130 additionally determines at block 906 whether or not the store target address of the snooped store-type request is currently being protected (i.e., matches the address in a RSV address field 148 or address register 172 associated with a B flag 152 or 174 that is set). If so, the snooped request is not permitted to reset any local reservation associated with the store target address, and the reservation update subprocess proceeds to join point 929. In response to a determination at block 906 that the store target address of the snooped request is not being protected, L2 cache 130 resets the RSV flag 150 associated with any of its RSV address registers 148 that matches the store target address of the target cache line (blocks 908-910). Following either block 908 or block 910, the reservation update subprocess proceeds to join point 929.

Referring now to the request servicing subprocess, L2 cache 130 determines at block 918 whether or not the target address of the snooped request is currently being protected (i.e., matches the address in a RSV address field 148 or address register 172 associated with a B flag 152 or 174 that is set). If so, L2 cache 130 provides a Retry coherence response, forcing the snooped request to be reissued by its source (block 924). Thereafter, the reservation update subprocess proceeds to join point 929. If, however, the target address of the snooped request is not currently being protected, L2 cache 130 determines at block 920 whether or not servicing the snooped request requires allocation of a SN machine 144. If not, no SN machine 144 is dispatched to service the snooped request. The L2 cache 130 will nevertheless provide the appropriate coherence response, if any (block 921), and the request servicing subprocess simply proceeds to join point 929. If, however, L2 cache 130 determines at block 920 that a SN machine 144 is required to service the snooped request, L2 cache 130 further determines at block 922 whether or not a SN machine 144 can presently be dispatched. In order to dispatch a SN machine 144, a SN machine 144 must be available (i.e., in the idle state) and no RC machine 146 or SN machine 144 can be busy servicing a request having a target cache line address matching that specified by the snooped request (among other dispatch constraints). Thus, for example, an RC machine 146 allocated to service a STCX request will prevent the dispatch of a local SN machine 144 to service a snooped request specifying a conflicting (i.e., matching) target cache line address.

In response to a determination at block 922 that a SN machine 144 cannot presently be dispatched to service the snooped request, L2 cache 130 provides a Retry coherence response on system interconnect 104 to indicate its present inability to service the snooped request (block 924). (In response to this Retry coherence response, the source of the snooped request may later represent the request on system interconnect 104.) Following block 924, the request servicing subprocess proceeds to join point 929. If, however, L2 cache 130 determines at block 922 that a SN machine 144 can presently be dispatched to service the snooped request, L2 cache 130 dispatches an idle SN machine 144 to service the snooped request (block 926). The dispatched snoop machine 144 transitions from the idle state to the busy state and then performs at block 928 whatever additional processing is required to service the snooped request (e.g., updating L2 storage array and directory 140 and/or L1 cache 110, sourcing a copy of the target cache line, providing protocol-dependent coherence responses, etc.). Following completion of its processing at block 928, the SN machine 144 dispatched to service the snooped request transitions from the busy state to the idle state, and the request servicing subprocess proceeds to join point 929.

Figure 10:
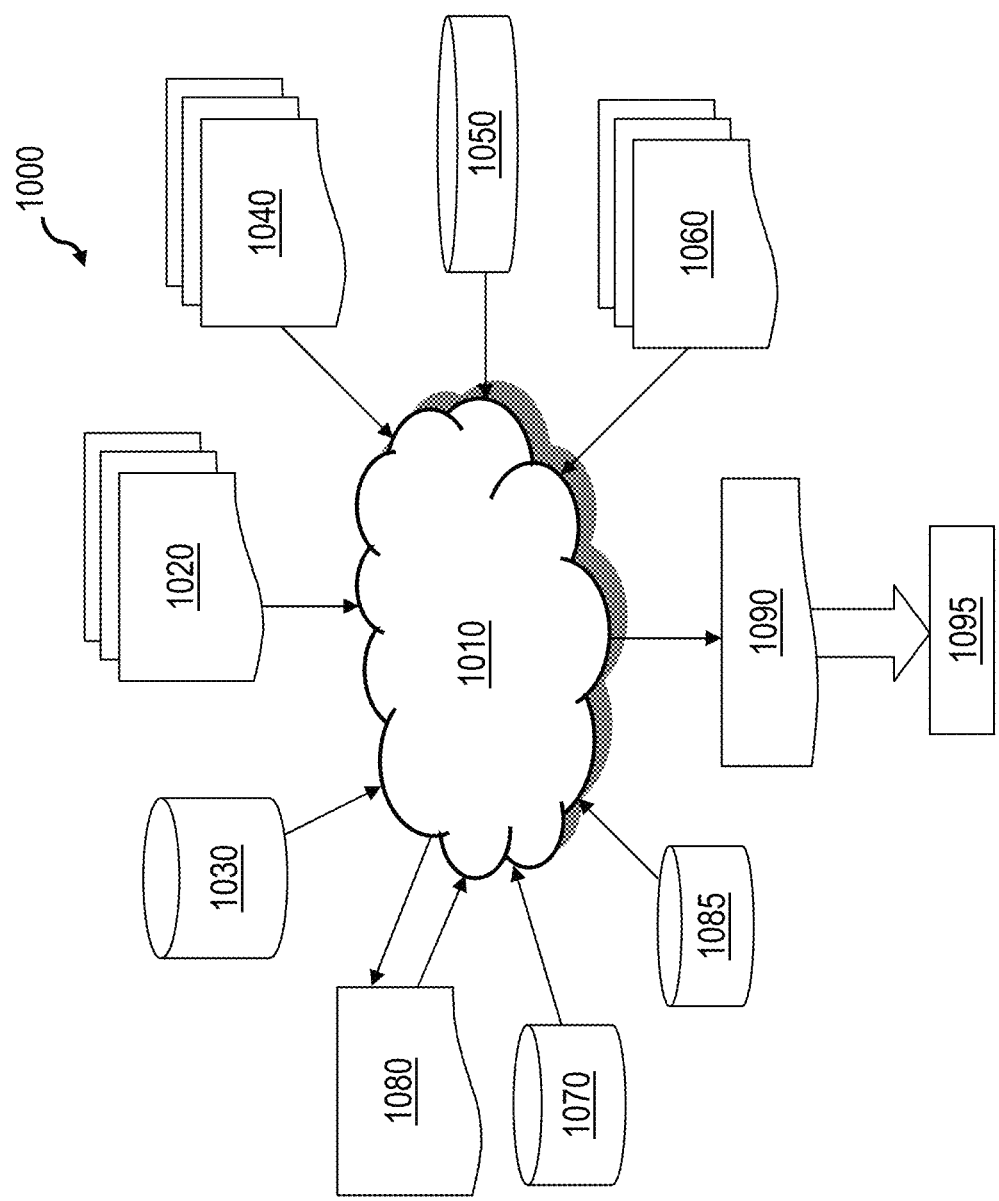
FIG. 10 is a block diagram of an exemplary design flow.

With reference now to FIG. 10, there is illustrated a block diagram of an exemplary design flow 1000 used for example, in semiconductor IC logic design, simulation, test, layout, and manufacture. Design flow 1000 includes processes, machines and/or mechanisms for processing design structures or devices to generate logically or otherwise functionally equivalent representations of the design structures and/or devices described above and shown herein. The design structures processed and/or generated by design flow 1000 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1000 may vary depending on the type of representation being designed. For example, a design flow 1000 for building an application specific IC (ASIC) may differ from a design flow 1000 for designing a standard component or from a design flow 1000 for instantiating the design into a programmable array, for example a programmable gate array (PGA) or a field programmable gate array (FPGA) offered by Altera® Inc. or Xilinx® Inc.

FIG. 10 illustrates multiple such design structures including an input design structure 1020 that is preferably processed by a design process 1010. Design structure 1020 may be a logical simulation design structure generated and processed by design process 1010 to produce a logically equivalent functional representation of a hardware device. Design structure 1020 may also or alternatively comprise data and/or program instructions that when processed by design process 1010, generate a functional representation of the physical structure of a hardware device. Whether representing functional and/or structural design features, design structure 1020 may be generated using electronic computer-aided design (ECAD) such as implemented by a core developer/designer. When encoded on a machine-readable data transmission, gate array, or storage medium, design structure 1020 may be accessed and processed by one or more hardware and/or software modules within design process 1010 to simulate or otherwise functionally represent an electronic component, circuit, electronic or logic module, apparatus, device, or system such as those shown herein. As such, design structure 1020 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1010 preferably employs and incorporates hardware and/or software modules for synthesizing, translating, or otherwise processing a design/simulation functional equivalent of the components, circuits, devices, or logic structures shown herein to generate a netlist 1080 which may contain design structures such as design structure 1020. Netlist 1080 may comprise, for example, compiled or otherwise processed data structures representing a list of wires, discrete components, logic gates, control circuits, I/O devices, models, etc. that describes the connections to other elements and circuits in an integrated circuit design. Netlist 1080 may be synthesized using an iterative process in which netlist 1080 is resynthesized one or more times depending on design specifications and parameters for the device. As with other design structure types described herein, netlist 1080 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1010 may include hardware and software modules for processing a variety of input data structure types including netlist 1080. Such data structure types may reside, for example, within library elements 1030 and include a set of commonly used elements, circuits, and devices, including models, layouts, and symbolic representations, for a given manufacturing technology (e.g., different technology nodes, 32 nm, 45 nm, 100 nm, etc.). The data structure types may further include design specifications 1040, characterization data 1050, verification data 1060, design rules 1090, and test data files 1085 which may include input test patterns, output test results, and other testing information. Design process 1010 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1010 without deviating from the scope and spirit of the invention. Design process 1010 may also include modules for performing standard circuit design processes such as timing analysis, verification, design rule checking, place and route operations, etc.

Design process 1010 employs and incorporates logic and physical design tools such as HDL compilers and simulation model build tools to process design structure 1020 together with some or all of the depicted supporting data structures along with any additional mechanical design or data (if applicable), to generate a second design structure 1090. Design structure 1090 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1020, design structure 1090 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 1090 may comprise a compiled, executable HDL simulation model that functionally simulates the devices shown herein.

Design structure 1090 may also employ a data format used for the exchange of layout data of integrated circuits and/or symbolic data format (e.g., information stored in a GDSII (GDS2), GL1, OASIS, map files, or any other suitable format for storing such design data structures). Design structure 1090 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1090 may then proceed to a stage 1095 where, for example, design structure 1090: proceeds to tape-out, is released to manufacturing, is released to a mask house, is sent to another design house, is sent back to the customer, etc.

As has been described, in at least one embodiment, a data processing system includes multiple processing units all having access to a shared memory. A processing unit includes a processor core that executes memory access instructions including a store-conditional instruction that generates a store-conditional request specifying a store target address and store data. The processing unit further includes a reservation register that records shared memory addresses for which the processor core has obtained reservations and a cache that services the store-conditional request by conditionally updating the shared memory with the store data based on the reservation register indicating a reservation for the store target address. The processing unit additional includes a blocking state machine configured to protect the store target address against access by any conflicting memory access request during a protection window extension following servicing of the store-conditional request.

While various embodiments have been particularly shown and described, it will be understood by those skilled in the art that various changes in form and detail may be made therein without departing from the spirit and scope of the appended claims and these alternate implementations all fall within the scope of the appended claims.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although a particular embodiment of a memory hierarchy has been described in which L1 and L2 caches are incorporated within a processing unit, those skilled in the art will appreciate that a greater or lesser number of levels of cache hierarchy may be employed. Further, these levels of cache hierarchy may include in-line or lookaside caches and may include one or more levels of off-chip cache. Further, the level of cache hierarchy at which coherency is determined may differ from that discussed with reference to the described embodiments.

Further, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

The program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A processing unit for a data processing system including multiple processing units all having access to a shared memory, said processing unit comprising:
   a processor core that executes memory access instructions including a store-conditional instruction, wherein execution of the store-conditional instruction generates a store-conditional request that specifies a store target address and store data;
   a reservation register that records shared memory addresses for which the processor core has obtained reservations;
   a cache array that services the store-conditional request by conditionally updating the shared memory with the store data based on the reservation register indicating a reservation for the store target address;
   a history buffer that records prior store target addresses successfully updated by store-conditional requests of the processor core; and
   a blocking state machine configured to protect the store target address against access by any conflicting memory access request during a protection window extension following servicing of the store-conditional request based on the store target address matching a prior store target address in the history buffer.

2. The processing unit of claim 1, and further comprising a blocking timer that determines a maximum duration of the protection window extension.

3. The processing unit of claim 1, wherein the blocking state machine is configured to end the protection window extension responsive to receipt by the cache of a new load-reserve request from the processor core.

4. The processing unit of claim 1, and further comprising a reservation management circuit that controls a maximum duration for which the processing unit can provide a protection window extension for any store target address.

5. The processing unit of claim 1, and further comprising reservation management circuit that intermittently inhibits the processing unit from providing a protection window extension for any store target address.

6. A data processing system, comprising:
the multiple processing units, including the processing unit of claim 1;
the shared memory; and
a system interconnect communicatively coupling the shared memory and the multiple processing units.

7. A method of data processing in a processing unit of a data processing system including multiple processing units all having access to a shared memory, said method comprising:
a processor core of the processing unit executing memory access instructions including a store-conditional instruction, wherein execution of the store-conditional instruction generates a store-conditional request that specifies a store target address and store data;
a reservation register of the processing unit recording shared memory addresses for which the processor core has obtained reservations;
a cache array of the processing unit servicing the store-conditional request by conditionally updating the shared memory with the store data based on the reservation register indicating a reservation for the store target address;
a history buffer of the processing unit recording prior store target addresses successfully updated by store-conditional requests of the processor core; and
a blocking state machine protecting the store target address against access by any conflicting memory access request during a protection window extension following servicing of the store-conditional request based on the store target address matching a prior store target address in the history buffer.

8. The method of claim 7, and further comprising determining a maximum duration of the protection window extension by reference to a blocking timer.

9. The method of claim 7, and further comprising the blocking state machine ending the protection window extension responsive to receipt by the cache of a new load-reserve request from the processor core.

10. The method of claim 7, and further comprising controlling a maximum duration for which the processing unit can provide a protection window extension for any store target address.

11. The method of claim 7, and further comprising intermittently inhibiting the processing unit from providing a protection window extension for any store target address.

12. A design structure tangibly embodied in a machine-readable storage device for designing, manufacturing, or testing an integrated circuit, the design structure comprising:
a processing unit for a multiprocessor data processing system including a shared memory, the processing unit including:
a processor core that executes memory access instructions including a store-conditional instruction, wherein execution of the store-conditional instruction generates a store-conditional request that specifies a store target address and store data;
a reservation register that records shared memory addresses for which the processor core has obtained reservations;
a cache array that services the store-conditional request by conditionally updating the shared memory with the store data based on the reservation register indicating a reservation for the store target address;
a history buffer that records prior store target addresses successfully updated by store-conditional requests of the processor core; and
a blocking state machine configured to protect the store target address against access by any conflicting memory access request during a protection window extension following servicing of the store-conditional request based on the store target address matching a prior store target address in the history buffer.

13. The design structure of claim 12, and further comprising a blocking timer that determines a maximum duration of the protection window extension.

14. The design structure of claim 12, wherein the blocking state machine is configured to end the protection window extension responsive to receipt by the cache of a new load-reserve request from the processor core.

15. The design structure of claim 12, and further comprising reservation management circuit that controls a maximum duration for which the processing unit can provide a protection window extension for any store target address.

16. The design structure of claim 12, and further comprising reservation management circuit that intermittently inhibits the processing unit from providing a protection window extension for any store target address.

* * * * *